United States Patent [19]

Garbutt et al.

[11] Patent Number: 5,503,808
[45] Date of Patent: Apr. 2, 1996

[54] PORTABLE INTEGRATED OZONE GENERATOR

[75] Inventors: Cornelius D. Garbutt, St. Augustine; Douglas A. Moxley, Ponte Vedra, both of Fla.

[73] Assignee: Ozact, Inc., Lake Worth, Fla.

[21] Appl. No.: 172,735

[22] Filed: Dec. 27, 1993

[51] Int. Cl.⁶ ........................................ B01J 19/08
[52] U.S. Cl. ................... 422/186.08; 422/186.07; 422/186.09
[58] Field of Search .......... 422/186.07, 186.08, 422/186.09

[56] References Cited

U.S. PATENT DOCUMENTS 4,430,306  2/1984  Namba et al. ............... 422/292
4,877,588  10/1989  Ditzler et al. ............... 422/186.19

OTHER PUBLICATIONS

Dimitriou, M. A., "Design Guidance Manual For Ozone Systems", Pan American Committee of the Int'l Ozone Assn., 1990, pp. 3–55.

Primary Examiner—Donald P. Walsh
Assistant Examiner—Daniel Jenkins
Attorney, Agent, or Firm—Malin, Haley, DiMaggio & Crosby

[57] ABSTRACT

A portable compact ozone generator for producing a consistent source of ozone portably that eliminates nitrous oxides and nitric acid. The device includes a small air compressor that provides compressed ambient air to a pair of molecular sieves that eliminate humidity and concentrates oxygen to provide a source of dry oxygen to the ozone generator.

2 Claims, 2 Drawing Sheets

5,503,808

PORTABLE INTEGRATED OZONE GENERATOR

BACKGROUND OF THE INVENTION

1. Field of Invention

This invention relates generally to ozone ($O^3$) generators and in particular to a portable, compact ozone generator to produce a source of ozone for various uses such as air odor removal and air purification.

2. Description of the Prior Art

Ozone generators are well known in the prior art. Ozone is a naturally occurring oxygen compound designated as $O^3$ and comprises a blue gaseous allotrope of oxygen derived or formed naturally from diatomic oxygen on electric discharge or exposure to ultraviolet radiation. As it is well known, ozone is an unstable, powerfully bleaching poisonous oxidizing agent with a pungent irritating odor used to purify and deodorize air, to sterilize water, and as a bleach. Because of its practical use, ozone generators have been developed to produce ozone artificially for its commercial application. Most ozone generators are large, bulky systems that remain in a fixed location.

Portable ozone generators which produce ozone from ambient air require an external source of dry oxygen (such as pressurized bottled gas). Small portable ozone generators that utilize ambient air as a feed gas typically produce inconsistent amounts of ozone which are dependent upon the humidity, temperature, contamination and oxygen content of the available air source. Because of the abundance of nitrogen in ambient air as a percentage of oxygen, when separating nitrogen and oxygen, as the humidity increases, more nitrous oxide is produced which therefore reduces the number of oxygen atoms available to produce ozone. Generating ozone with nitrogen present produces deleterious nitrous oxides, resulting in nitric acid formation often within both the generator and the air stream expelled by the generator. Such nitric acid in the generator can severely corrode the equipment with a resultant loss of ozone production and often irreversible damage to the equipment. If the ozone generator is utilized in an area occupied by air breathing mammals including human beings, the expelled nitric oxide and nitric acid can be a respiratory irritant.

Some small portable ozone generators utilize an external source of dry oxygen such as a pressurized bottled gas. Small pressurized oxygen bottles of the type carried by patients with severe respiratory limitations might be considered portable but unfortunately do not provide a sufficient amount of oxygen for extended operation. Therefore, pressurized oxygen in a bottle of sufficient size would not be portable for abundant production of ozone. Large oxygen storage tanks under high pressure require sophisticated storage knowledge for safety reasons, and are extremely heavy and bulky.

The present invention provides an efficient, consistent, continuous source of ozone from a portable ozone generator that can be used with any available conventional electrical power source including ordinary 120 volt household AC current. As an example, in one application the device weights 34 lbs. and produces two grams pure ozone per hour. Lighter and heavier units can be made having proportionately less and more ozone outputs.

SUMMARY OF THE INVENTION

In integrated portable ozone generation systems comprising small electrically driven air compressor, a molecular sieve system connected to the output of the air compressor that concentrates available ambient air 20% oxygen up to an 85% to 90% concentration while extracting moisture end nitrogen and an ozone generator connected to the output of the sieve system where a portion of the oxygen that is concentrated is converted to ozone.

The system is capable of delivering a continuous supply of pure ozone free from nitric acids and nitric oxides. The portable air compressor is used to provide ambient air under pressure that is forced into the molecular sieve system that traps water and nitrogen to allow concentration of the normal 20% oxygen in the ambient air up to a 85% to 90% concentration. By reducing the effective dew point of the delivered feed gas to the ozone generator to a greater than a minus 100% and eliminating nitrogen, the production of the nitric oxides and nitric acids is eliminated. The air compressor and ozone generator use ordinary 120 volt household current in a single easily portable cabinet to produce e continuous supply of ozone.

Therefore, the ozone generation system is a compact, portable and totally self-contained device that can produce consistent and continuous amounts of ozone regardless of the humidity levels or temperature of ambient air. The ozone generator has an indefinite operating life due to lack of nitric oxide that would cause corrosion. The quality of the ozone produced is free of nitric oxide and is thus better suited to the use for which it was intended. The invention can produce either ozone delivered to a external tube or injection into water or closed space such as a ventilating duct or refrigerated storage locker or by redirecting the tube feed back into the unit where it can be mixed with air by the combination cooling and dispersing fan for satirizing open areas.

An alternate embodiment can be operated on 12 or 24 volt DC for use in refrigerated trailer truck which carry produce and/or flowers so that the ozone can sanitize the contents, suppress mold and reduce ethylene gas concentrations that may over accelerate the ripening process of fruits and vegetables and shorten the life of flowers. Previous attempts to install ozone generators in have been unsuccessful because of the high humidity levels produced by the enclosed produce and the adverse effects of the produced nitrous and nitric acid compounds. Where air was drawn in from outside of the truck, ambient air conditions in southern regions of the United States and spray from a truck travelling at high speed in rain create high humidity problems. The portable unit in accordance with the invention can also be used with other large containers filled with produce or flowers that travel by ship or by rail.

It is an object of this invention to provide a device that can generate high quality ozone from a portable unit regardless of humidity of the ambient air.

Another object of this invention is to provide a portable, low weight, compact ozone generator that is self-contained and can be used with conventional electrical power sources such as 120 volt AC or 12 or 24 volt DC.

Yet another object of this invention is to provide a portable ozone generator that can be used in a mobile vehicle such as a truck trailer or train or ship container to provide ozone for commercial purposes for either produce or flowers being hauled.

And yet another object of this invention is to provide a portable ozone generator that can be used for direct injection of the ozone or in combination with an air dilution device for continuously generating high quality air ozone.

In accordance with these and other objects which will become apparent hereinafter, the instant invention will now

DESCRIPTION OF THE PREFERRED EMBODIMENTS

Figure 1:
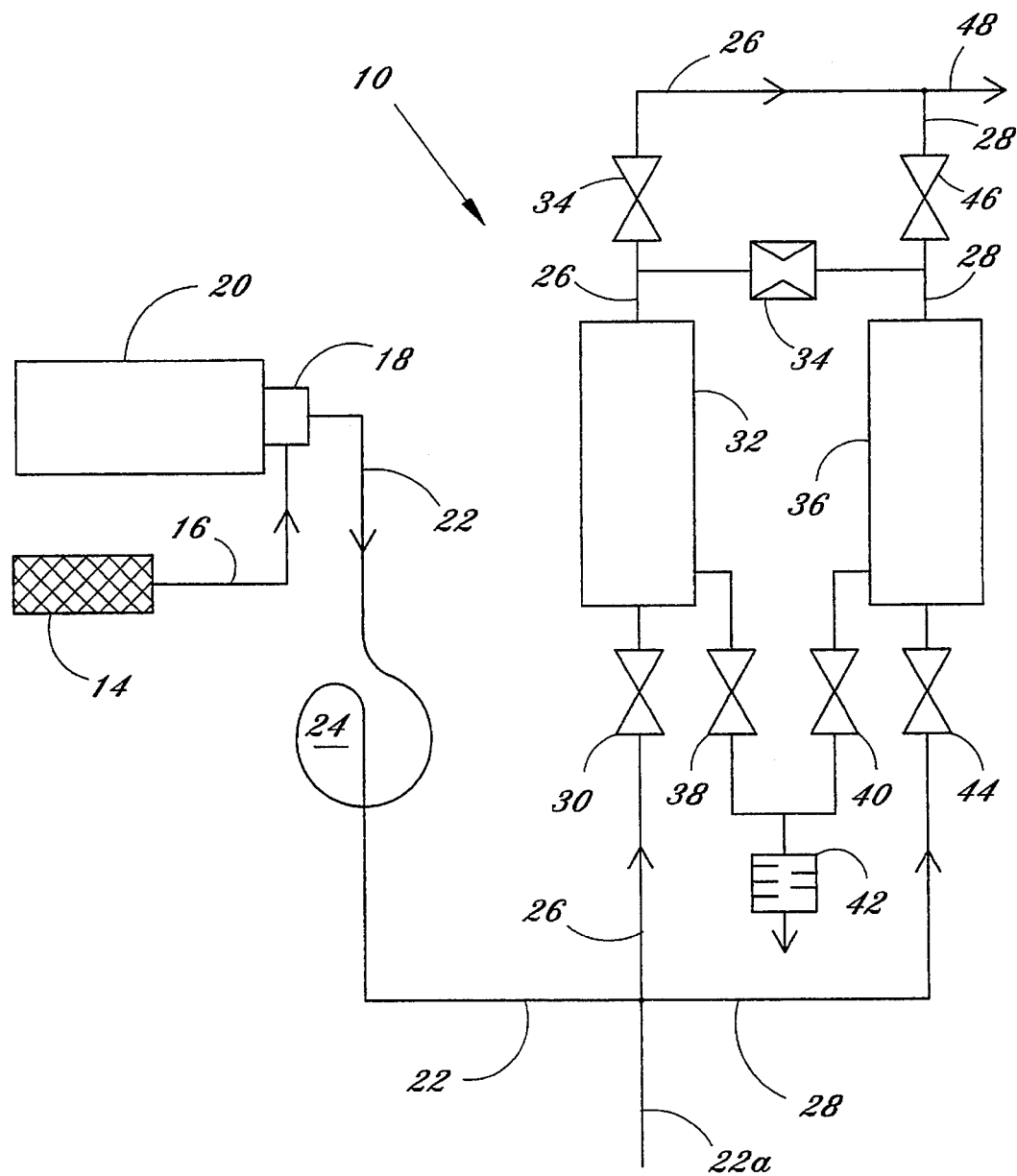
FIG. 1 shows a schematic drawing of the low humidity oxygen supply used the present invention.
Figure 2:
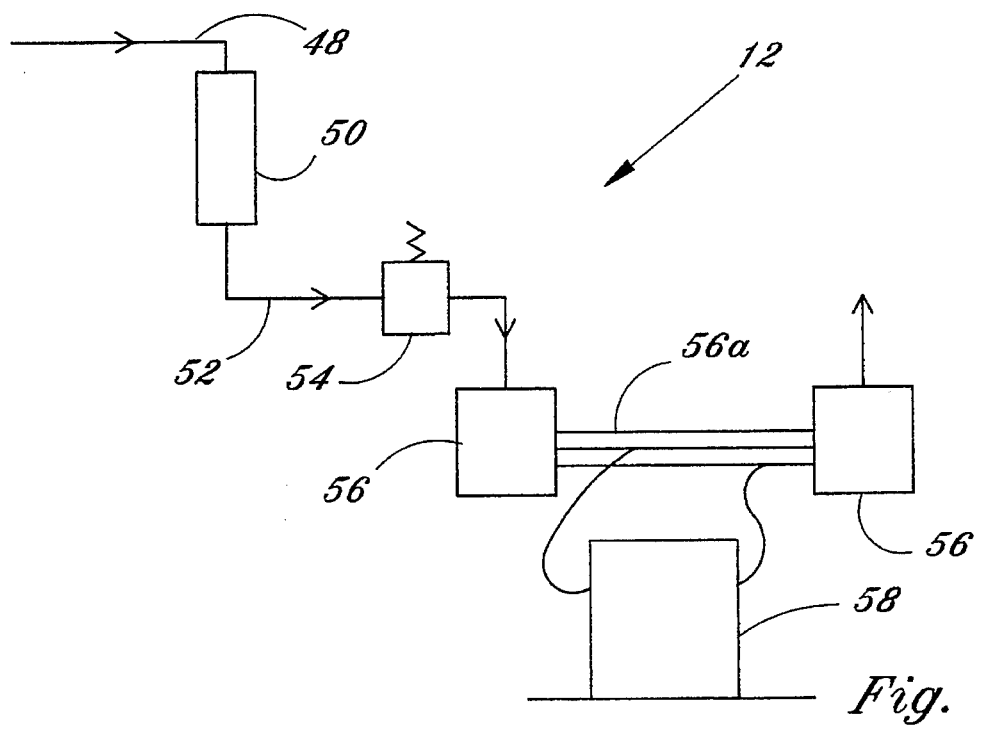
FIG. 2 shows the schematic diagram of the ozone generator used in the present invention.

The present invention is shown generally in FIGS. 1 and 2 comprised of a source of dry, pure oxygen having a source 10 (shown in FIG. 1) and an ozone generator supplying continuous ozone generally at 12 (in FIG. 2) which is connected to the dry oxygen source.

With respect to the operation of the device, ambient air, regardless of humidity, is drawn in through an air intake filter and resonator 14 connected to an air conduit 16, coupled to the inlet side of air compressor 18 that is powered from a rotational source of energy from electric motor 20 that can be attached to a conventional 120-volt AC outlet. The air is compressed in compressor 18 from approximately 13 psi to approximately 26 psi and expelled through conduit 22. The air is transferred through an after-cooler such as a multi-coil aluminum tube with a fan forcing air over it to reduce the temperature of the air under pressure and increase the gas density in conduit 22. The outlet of conduit 22 is located at a position 22a.

From this point forward, there are two separate, individually actuated molecular sieve vessels 32 and 36. Only one molecular sieve vessel will be utilized at a time because of how rapidly the vessels accumulate moisture and nitrogen. A plurality of valves allow the continuous flow of air under pressure from line 22 to move into either molecular sieve vessel 32 or to molecular sieve vessel 36 in a cyclical, periodic action. Thus, when the molecular sieve vessel is not in use, it is being purged by a backflow through an exhaust muffler 42. When the molecular sieve vessel is on line, it is trapping moisture and nitrogen particles which thoroughly dries out air under pressure, converting it to a very pure oxygen source which ultimately ends up in line 48 from either molecular sieve vessel through line 26 or through line 28.

In a typical sequence with molecular sieve vessel 32 on line and molecular sieve vessel 36 off line, valves 30 and 34 are open with a slight overflow through bidirectional fixed orifice 34 which moves backward into molecular sieve vessel 36 with valve 40 being open. Excess gases can be transferred out of exhaust muffler 42. In this sequence, valve 44 is closed, valve 38 is closed to contain incoming air in molecular sieve vessel 32, and valve 46 is closed. Thus, high pressure air from conduit 22 will go through valve 30 through the molecular sieve vessel 32 through valve 34 into conduit 26, where it is transferred into conduit 28. At this point, there will be very pure oxygen that has a dew point of $-100°$ F., which is ideal for ozone generation. Also, a slight amount of air under pressure goes through the fixed orifice 34 and into molecular sieve vessel 36 and through valve 40 to the exhaust muffler 42, thus disposing of excess humidity and nitrogen previously trapped in molecular sieve vessel 36.

Because the molecular sieve vessels are filled rapidly with moisture or nitrogen (between 6–14 seconds), all of the valve sequences discussed must be cycled rapidly and repeatedly to allow cleansing out of each molecular sieve vessel when it is not in use.

Therefore, once molecular sieve vessel 32 is filled with humidity and nitrogen, all the valves will be reversed, so that valve 44 will be open, valve 46 will be open, valves 30 and 34 will be closed, valve 40 will be closed, and valve 38 is open. Therefore, air under pressure from conduit 22 will commence at point 22a and be transferred through valve 44 through the molecular sieve vessel 36, where the humidity and nitrogen are removed, onward through valve 46 into conduit 28, where the air is received into the outlet conduit 48 as pure, dry oxygen, having a dew point of $-100°$ F. Also, excess air pressure will go through bidirectional fixed orifice 34 back into molecular sieve vessel 32, out through valve 38 and the exhaust muffler 42, which essentially purges molecular sieve vessel 32. The valves are periodically cycled automatically by a control unit attached to each valve.

The molecular sieve vessels 32 and 36 are filled with small beads, typically 1.5–4.5 millimeter diameter of an alkali aluminosilicate with an effective pore opening of 5 angstroms. Nitrogen, water vapor, and some carbon dioxide is absorbed into the molecular sieve material to achieve a very dry, concentrated stream of oxygen out of the top of each vessel. The exit gas will be in the range of 85 to 92% pure oxygen at a dew point of $-100°$ F. or greater. A small amount of the exiting oxygen from each molecular sieve vessel 32 or 36 passes over the bidirectional fixed orifice and flows into the opposite vessel because the pressure drop across the orifice 34 is lower then the combined pressure drop of the remaining devices downstream of the opposite vessel, and valves 38 or 40 are open to atmosphere. Thus, the small amount of oxygen combined with the depressurization of each vessel, the oxygen remaining in the upper volume of the vessel and the exit tube displaces the gases and moisture absorbed into the molecular sieve material, as well as any free air. This displaced gas exits to atmosphere through either an open valve 38 or 40. The exhaust muffler is attached to the venting tubes from each vessel 32 and 36 to suppress noise created when the pressure within a vessel is suddenly relieved by the opening of a valve.

Because of the limited size of the vessel and the saturation time of the molecular sieve, materials are saturated. All the valves are controlled by a timer that energize and deenergize all the valves which are either (by spring action) normally open or normally closed in the deenergized state. The energized solenoid operator can overcome spring force to move the valve to the opposite condition when energized. For cost and space reduction, check valves can be used in place of valves 30 and 36, and a single operated solenoid with a multi-port valve, which has all the functions of the four remaining single solenoid valves, can be combined.

Referring now to FIG. 2, the purified oxygen, which is dry, is transferred under pressure through conduit 48 into an oxygen surge tank 50. This tank can accommodate variations in pressure and flow due to changes in the valve positions and gas absorption rates. The tank also maintains a charge of oxygen, whenever the system is shut down, so that oxygen is immediately available to the generator upon startup. FIG. 2 shows the oxygen generator system 12 that also includes a pressure reducing device 54 connected to the output of oxygen surge tank 50 through conduit 52, which itself has an outlet going to the actual ozone generator 56. Ozone generator 56 includes a 5,000-volt transformer 58 and a flow area 56a where the pure oxygen is converted into ozone due to the 5,000-volt alternating current field. The resulting ozone is transported by residual oxygen to the outlet exhaust manifold for its subsequent use. The ozone can either be vented into a forced air fan for dilution and delivery to the point of use or into a tube fitting in the portable cabinet wall for delivery as undiluted ozone.

The system shown in FIGS. 1 and 2 is mounted in a single, rigid cabinet with a cord used for providing power to a typical 120-volt AC outlet. By using the present portable compact unit, a 72 lb. device can produce approximately 6 grams per hour of pure ozone. Other small units at a lower output are also available.

Figure 3:
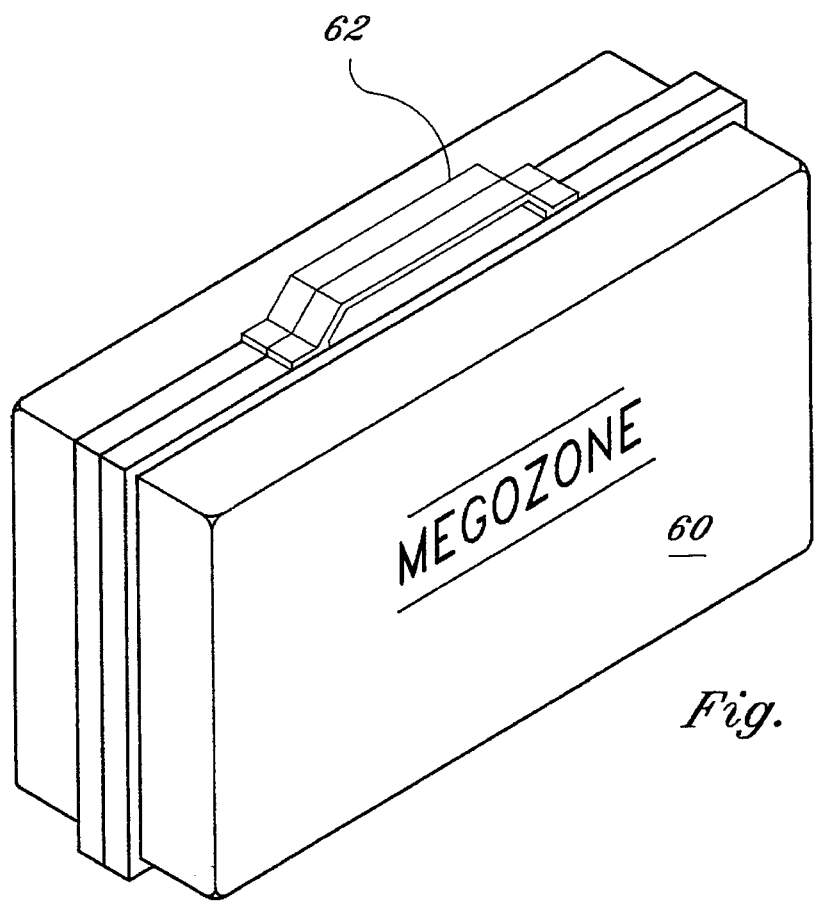
FIG. 3 shows a portable housing used in the invention.

FIG. 3 shows a rigid metal portable housing 60 that contains the device described in FIGS. 1 and 2 having a carrying handle 62.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A portable, compact ozone generation system comprising:

an air compressor powered by an electric motor, said compressor having an air intake including an intake filter and a resonator, and an air outlet;

said air outlet communicating with a means for cooling compressed air;

a pair of molecular sieve vessels for removing moisture and nitrogen from compressed air and expelling oxygen, each of said vessels having an air inlet an air outlet and a purge outlet, said vessel inlets in parallel fluid communication with said means for cooling;

a bidirectional fixed orifice device in fluid communication with each of said vessel air outlets;

means for controlling compressed air flow through said vessels such that said vessels are cycled on-line and off-line in alternating sequence, thereby allowing compressed air to flow through the on-line vessel inlet wherein moisture and nitrogen are removed from said air such that oxygen flows out of the on-line vessel outlet whereafter a portion of said oxygen flows through said fixed orifice, through the off-line vessel outlet and out of the off-line vessel purge outlet thereby purging accumulated water and nitrogen from the off-line vessel;

an oxygen tank having a tank inlet in fluid communication with each of said vessel outlets for receiving oxygen from an on-line vessel, said tank having a tank outlet;

an ozone generator in fluid communication with said tank outlet, said ozone generator incorporating a pressure relieving device, and a flow area electrically connected to a 5,000 volt electric transformer for producing an alternating current field for generating ozone from oxygen; and a portable cabinet housing said compact ozone generation system.

2. A device as claimed in claim 1, wherein said cabinet is a rigid metal housing having a handle and an electrical cord extending from, with said ozone generating system contained within said cabinet.

* * * * *